United States Patent
Moss

(10) Patent No.: US 8,569,969 B2
(45) Date of Patent: Oct. 29, 2013

(54) METHODS AND APPARATUS FOR CONTROLLING MULTIPLE LIGHT SOURCES VIA A SINGLE REGULATOR CIRCUIT TO PROVIDE VARIABLE COLOR AND/OR COLOR TEMPERATURE LIGHT

(75) Inventor: Timothy Moss, Chicago, IL (US)

(73) Assignee: Koninklijke Philips N.V., Eindhoven (NL)

( * ) Notice: Subject to any disclaimer, the term of this patent is extended or adjusted under 35 U.S.C. 154(b) by 282 days.

(21) Appl. No.: 13/122,921

(22) PCT Filed: Oct. 2, 2009

(86) PCT No.: PCT/IB2009/054323
§ 371 (c)(1),
(2), (4) Date: Apr. 6, 2011

(87) PCT Pub. No.: WO2010/041183
PCT Pub. Date: Apr. 15, 2010

(65) Prior Publication Data
US 2011/0193489 A1    Aug. 11, 2011

Related U.S. Application Data

(60) Provisional application No. 61/104,570, filed on Oct. 10, 2008.

(51) Int. Cl.
*H05B 37/02* (2006.01)
(52) U.S. Cl.
USPC ........ 315/291; 315/209 R; 315/307; 315/224; 315/247
(58) Field of Classification Search
USPC .......... 323/222, 223, 282, 284, 285; 315/291, 315/224, 247, 209 R, 307, 185 R, 186, 297, 315/187

See application file for complete search history.

(56) References Cited

U.S. PATENT DOCUMENTS

| | | | |
|---|---|---|---|
| 6,016,038 A | 1/2000 | Mueller et al. | |
| 6,211,626 B1 | 4/2001 | Lys et al. | |
| 6,359,392 B1 | 3/2002 | He | |
| 6,833,689 B1* | 12/2004 | Wong et al. | 323/222 |
| 7,049,794 B2* | 5/2006 | Wong et al. | 323/222 |
| 7,256,554 B2* | 8/2007 | Lys | 315/291 |
| 7,368,894 B2* | 5/2008 | Wong et al. | 323/222 |
| 7,538,534 B2* | 5/2009 | Mednik et al. | 323/285 |
| 7,737,643 B2* | 6/2010 | Lys | 315/291 |
| 2003/0112229 A1 | 6/2003 | Pong et al. | |
| 2005/0219872 A1 | 10/2005 | Lys | |
| 2006/0103365 A1 | 5/2006 | Ben-Yaacov | |

FOREIGN PATENT DOCUMENTS

EP    1429222 A1    6/2004

* cited by examiner

*Primary Examiner* — Vibol Tan
(74) *Attorney, Agent, or Firm* — Yuliya Mathis

(57) ABSTRACT

Methods and apparatus for adjusting the color or color temperature of combined light emitted by one or more LEDs (210, 220, 230) driven by a single switching regulator circuit (200). Properties of the light output are changed by intentionally varying a source voltage (212) provided as an input to the regulator circuit (205). The connection of different colored LEDs in various branches (160, 170, 180) of the switching regulator circuit (205) facilitates adjustment of the respective drive currents provided to the LEDs, and hence the color or color temperature of the resulting combined light, merely by adjusting the level of the source voltage of the regulator circuit.

20 Claims, 11 Drawing Sheets

METHODS AND APPARATUS FOR CONTROLLING MULTIPLE LIGHT SOURCES VIA A SINGLE REGULATOR CIRCUIT TO PROVIDE VARIABLE COLOR AND/OR COLOR TEMPERATURE LIGHT

TECHNICAL FIELD

The present invention is directed generally to controlling power delivered to one or more light sources. More particularly, various inventive methods and apparatus disclosed herein relate to a modified switching regulator circuit for providing power to one or more light-emitting diodes (LEDs) to produce a desired lighting effect (e.g., dimming, variable color, and/or variable color temperature control).

BACKGROUND

Digital lighting technologies, i.e. illumination based on semiconductor light sources, such as LEDs, offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

A DC-DC converter is a well-known electrical device that accepts a DC input voltage and provides a DC output voltage to a load. DC-DC converters generally are configured to provide a regulated DC output voltage or current to a load (a "load voltage" or "load current") based on an unregulated DC source voltage which in some cases is different from the output voltage. For example, in many automotive applications in which a battery provides a DC power source having an unregulated voltage of approximately 12 Volts, a DC-DC converter may be employed to receive the unregulated 12 Volts DC as a source and provide a regulated DC output voltage or current to drive various electronic circuitry in a vehicle (instrumentation, accessories, engine control, lighting, radio/stereo, etc.). The DC output voltage may be lower, higher or the same as the source voltage from the battery.

More generally, a DC-DC converter may be employed to transform an unregulated voltage provided by any of a variety of DC power sources such as batteries to a more appropriate regulated voltage or current for driving a given load. In some cases, the unregulated DC source voltage may be derived from an AC power source, such as a 120 Vrms/60 Hz AC line voltage which is rectified and filtered by a bridge rectifier/filter circuit arrangement. In this case, protective isolation components (e.g., a transformer) may be employed in the DC-DC converter to ensure safe operation, given the potentially dangerous voltages involved.

FIG. 1 illustrates a circuit diagram of a conventional step-down DC-DC converter 100 configured to provide a DC load voltage 102 ($V_{load}$) and a regulated load current 103 ($I_{load}$) to a load 104 based on a higher unregulated DC source voltage 112 ($V_{source}$). In exemplary lighting applications, the load 104 may be a light source such as one or more LEDs. The unregulated source voltage $V_{source}$ is expected to vary slightly (and randomly) over some relatively small range around a nominal value; however, in conventional DC-DC converter configurations, the source voltage $V_{source}$ would not be intentionally varied. The step-down converter of FIG. 1 also is commonly referred to as a "buck" converter.

DC-DC converters, like the buck converter of FIG. 1, employ a transistor or equivalent device that is configured to operate as a saturated switch which selectively allows energy to be stored in an energy storage device (e.g., refer to the transistor switch 122 and the inductor 124 in FIG. 1). Although FIG. 1 illustrates such a transistor switch as a bipolar junction transistor (BJT), field effect transistors (FETs) also may be employed as switches in various DC-DC converter implementations. By virtue of employing such a transistor switch, DC-DC converters also are commonly referred to as "switching regulators" due to their general functionality.

In particular, the transistor switch 122 in the circuit of FIG. 1 is operated to periodically apply the unregulated DC source voltage 112 ($V_{source}$) across an inductor 124 for relatively short time intervals (in FIG. 1 and the subsequent figures, unless otherwise indicated, a single inductor is depicted to schematically represent one or more actual inductors arranged in any of a variety of serial/parallel configurations to provide a desired inductance). During the intervals in which the transistor switch is "on" or closed (i.e., passing the source voltage $V_{source}$ to the inductor), current flows through the inductor based on the applied voltage and the inductor stores energy in its magnetic field. If the inductor current $I_L$ exceeds the load current $I_{load}$ when the transistor switch is closed, energy is also stored in a filter capacitor 126. When the switch is turned "off" or opened (i.e., the DC source voltage is removed from the inductor), the energy stored in the inductor is transferred to the load 102 and the filter capacitor 126 which functions with the inductor 124 to provide a relatively smooth DC voltage $V_{load}$ to the load 102 (i.e., when the inductor current $I_L$ is less than the load current $I_{load}$, the capacitor supplies the difference to provide essentially continuous energy to the load between inductor energy storage cycles). In continuous mode, not all of the energy stored in the inductor is transferred to either the load or the capacitor.

More specifically, in FIG. 1, when the transistor switch 122 is on, a voltage $V_L = V_{load} - V_{source}$ is applied across the inductor 124. This applied voltage causes a linearly increasing current $I_L$ to flow through the inductor (and to the load and the capacitor) based on the relationship $V_L = L \cdot dI_L/dt$. When the transistor switch 122 is turned off, the current $I_L$ through the inductor continues to flow in the same direction, with "freewheeling" diode 128 now conducting to complete the circuit. As long as current is flowing through the freewheeling diode 128, the voltage $V_L$ across the inductor is fixed at $V_{load} - V_x$, causing the inductor current $I_L$ to decrease linearly as energy is provided from the inductor's magnetic field to the capacitor and the load. FIG. 2 is a diagram illustrating various signal waveforms for the circuit of FIG. 1 during the switching operations described immediately above.

Conventional DC-DC converters may be configured to operate in different modes, commonly referred to as "continuous" mode and "discontinuous" mode. In continuous mode operation, the inductor current $I_L$ remains above zero during successive switching cycles of the transistor switch, whereas in discontinuous mode, the inductor current starts at zero at the beginning of a given switching cycle and returns to zero before the end of the switching cycle. To provide a somewhat simplified yet informative analysis of the circuit of FIG. 1, the discussion below considers continuous mode operation, and assumes for the moment that there are no voltage drops across the transistor switch when the switch is on (i.e., conducting) and that there is a negligible voltage drop across the freewheeling diode 128 while the diode is conducting current. With the foregoing in mind, the changes in inductor current over successive switching cycles may be examined with the aid of FIG. 3.

FIG. 3 is a graph on which is superimposed the voltage at the point $V_X$ shown in FIG. 1 (again, ignoring any voltage drop across the freewheeling diode 128) based on the operation of the transistor switch 122, and the current through the inductor $I_L$ for two consecutive switching cycles. In FIG. 3, the horizontal axis represents time t and a complete switching cycle is represented by the time period T, wherein the transistor switch "on" time is indicated as $t_{on}$ and the switch "off" time is indicated as $t_{off}$ (i.e., $T = t_{on} + t_{off}$).

For steady state operation, it should be appreciated that the inductor current $I_L$ at the start and end of a switching cycle is essentially the same, as can be observed in FIG. 3 by the indication $I_o$. Accordingly, from the relation $V_L = L \cdot dI_L/dt$, the change of current $dI_L$ over one switching cycle is zero, and may be given by:

$$dI_L = 0 = \frac{1}{L}\left(\int_0^{t_{on}} (V_{source} - V_{load}) dt + \int_{t_{on}}^{T} (-V_{load}) dt\right)$$

which simplifies to $$(V_{source} - V_{load}) t_{on} - (V_{load})(T - t_{on}) = 0$$

or $$\frac{V_{load}}{V_{source}} = \frac{t_{on}}{T} = D,$$

where D is defined as the "duty cycle" of the transistor switch, or the proportion of time per switching cycle that the switch is on and allowing energy to be stored in the inductor. From the foregoing, it can be seen that the ratio of the output voltage to the source voltage is proportional to D; namely, by varying the duty cycle D of the switch in the circuit of FIG. 1, the load voltage $V_{load}$ may be varied with respect to the source voltage $V_{source}$ but cannot exceed the source voltage, as the maximum duty cycle D is 1.

In the apparatus 100, the load 104 may be one or more LEDs, and the intensity or brightness of radiation generated by the LED(s) is proportional to the average power delivered to the LED(s) over a given time period. Accordingly, one technique for varying the intensity of radiation generated by the LED(s) involves modulating the power delivered to the LED(s). Since power is defined as the amount of energy transferred in a given time period (i.e., P=dW/dt), the power P provided to the load may be expressed as $$P = \frac{dW}{dt} = \frac{\frac{1}{2}L(I_P)^2}{T} = \frac{1}{2}L(I_P)^2 f,$$

where f=1/T is the switching frequency of the transistor switch 128. From the foregoing, it may be appreciated that the power provided to the load 104 may be modulated by varying one or both of the switching frequency f and the peak inductor current $I_P$, given the inductance L of the inductor 124, where the peak inductor current $I_P$ is determined by the duty cycle D of the transistor switch 122. It should be appreciated, however, that in practice, the relationship between frequency and LED brightness may not be linear as indicated by the above expression. Rather, as the switching frequency is increased, the average current to the LED(s) increases as the amount of ripple, or peak-to-peak excursion is reduced. However, as the average current approaches the peak value, the amount of ripple is small, and further increases in switching frequency may yield diminishing returns.

Hence, as mentioned earlier, the conventional buck converter of FIG. 1 is particularly configured to provide to the load 104 a voltage $V_{load}$ that is lower than the source voltage $V_{source}$. To ensure stability of the load voltage $V_{load}$ or load current $I_{load}$ as shown in FIG. 1, the buck converter employs a feedback control circuit 130 to control the operation of the transistor switch 122, thereby regulating the load voltage or the load current. Generally, power for various components of the feedback control circuit 130 may be derived from the DC source voltage $V_{source}$ or alternatively from another independent source of power.

While one or both of the load voltage and load current may be regulated, different types of loads may lend themselves more readily to either voltage regulation or current regulation. For exampling, considering LEDs as one exemplary load, in some applications it may be preferable to regulate load current rather than load voltage (e.g., due to different forward voltages for different types of LEDs, and/or different numbers and arrangements of LEDs constituting the load). Accordingly, primarily for purposes of illustration, the feedback control circuit shown in FIG. 1 is configured for current regulation of an exemplary LED-based load. It should be appreciated, however, that for any of the switching regulator circuits discussed herein, one or both of the load voltage and the load current may be regulated via the feedback control circuit 130 by deriving one or more appropriate values representative of the load voltage and/or the load current.

For example, in the feedback control circuit 130 of FIG. 1, the load current $I_{load}$ may be sampled by placing a grounded resistor $R_{sample}$ having a relatively small resistance in series with the load 104. A voltage $V_{sample}$ measured across the resistor $R_{sample}$ may be provided as an input to the feedback control circuit 130 representative of the load current (alternatively, the load voltage $V_{load}$ rather than the load current $I_{load}$ may be sampled by generating a voltage $V_{sample}$ via a voltage divider (not shown) placed in parallel with the load 104). The sampled voltage $V_{sample}$ may be compared to a reference voltage $V_{ref}$ in the feedback control circuit 130 using a voltage comparator such as the operational amplifier 132. The reference voltage $V_{ref}$ is a stable scaled representation of a desired regulated load voltage $V_{load}$ or regulated load current $I_{load}$. The operational amplifier 132 generates an error signal 134 based on the comparison of $V_{sample}$ and $V_{ref}$ and the magnitude of this error signal ultimately controls the operation of the transistor switch 122.

More specifically, the error signal 134 serves as a control voltage for a pulse width modulator 136 which also receives a pulse stream having a frequency f=1/T provided by an oscillator 138. In conventional DC-DC converters, exemplary frequencies f for the pulse stream include, but are not limited to, a range from approximately 50 kHz to 100 kHz. For implementations in which the load includes one or more LEDs, the light emitted from the LEDs may be perceived as being continuous as long as the switching frequency of the transistor switch 122 is greater than that capable of being detected by the human eye (e.g., greater than approximately 100 Hz). That is, an observer of light generated by the LED(s) does not perceive discrete on and off cycles (commonly referred to as the "flicker effect"), but instead the integrating function of the eye perceives essentially continuous illumination. The pulse width modulator 136 is configured to use both the pulse stream and the error signal 134 to provide an on/off control voltage signal 140 that controls the duty cycle of the transistor switch 122. In essence, a pulse of the pulse stream acts as a "trigger" to cause the pulse width modulator 136 to turn the transistor switch 122 on, and the error signal 134 determines how long the transistor switch stays on (i.e., the length of the time period $t_{on}$ and hence the duty cycle D).

For example, if the error signal 134 indicates that the sampled output voltage $V_{sample}$ is higher than $V_{ref}$ (i.e., the error signal 134 has a relatively lower value), the pulse width modulator 136 is configured to provide the control signal 140 with relatively shorter duration "on" pulses or a lower duty cycle, thereby providing relatively less energy to the inductor while the transistor switch 122 is on. In contrast, if the error signal 134 indicates that $V_{sample}$ is lower than $V_{ref}$ (i.e., the error signal has a relatively higher value), the pulse width modulator is configured to provide a control signal with relatively longer duration "on" pulses or a higher duty cycle, thereby providing relatively more energy to the inductor while the transistor switch 122 is on. Accordingly, by modulating the duration of the "on" pulses of the control signal 140 via the error signal 134, the load voltage $V_{load}$ or load current $I_{load}$ is regulated by the feedback control circuit 130 to approximate a desired load voltage or current represented by $V_{ref}$.

In conventional buck converters such as that shown in FIG. 1, in order to change/vary one or more operating characteristics of the load (via changes to the load voltage and/or the load current), access to the feedback control circuit 130 is required to adjust the reference voltage $V_{ref}$, which in turn results in a change in the regulated load current $I_{load}$ (or regulated load voltage $V_{load}$, as applicable). Adjustments to $V_{ref}$ may be facilitated by a user interface 150 which may be an analog or digital device, such as a potentiometer or a digital-to-analog converter (DAC) used to change the reference voltage $V_{ref}$. Of course, any resulting changes in $V_{load}$ or $I_{load}$ similarly affect all constituents of a load that may comprise multiple components; for example, in an LED-based load comprising multiple LEDs interconnected in any of a variety of serial/parallel arrangements, the operating voltage and current of each LED is affected similarly by changing conditions of the buck regulator circuit (e.g., changes to $V_{ref}$).

SUMMARY

Applicant has recognized and appreciated that adjusting a desired light output of a lighting apparatus incorporating a switching regulator circuit does not necessarily require access to the feedback control loop (in order to change $V_{ref}$). More generally, Applicant has recognized and appreciated that various current paths of a switching regulator circuit (e.g., a buck regulator circuit) employed as part of an LED-based lighting apparatus may be respectively considered as suitable for accommodating an LED-based load, in addition to or as an alternative to the conventional placement of a load in such a circuit, so as to provide a versatile, yet simple variable color and/or color temperature lighting apparatus.

In view of the foregoing, the present disclosure is directed to inventive methods and apparatus for providing variable color or variable color temperature light emitted by one or more LEDs driven by a single switching regulator circuit.

As discussed in further detail herein, controlling multiple different spectrum LEDs via a single switching regulator circuit provides multiple advantages, including but not limited to reduced complexity, size, and cost of LED driver circuits. In prior art color mixing applications, different spectrum LEDs generally need to be controlled differently to vary the color or color temperature of light resulting from the combined spectrums. To this end, one switching regulator circuit typically is required in conventional implementations to individually vary each LED or group of LEDs having a different spectrum. In contrast, various embodiments disclosed herein allow for some degree of variable control of multiple LEDs having different spectrums using a single switching regulator circuit.

In one aspect, light output from a lighting apparatus incorporating a switching regulator circuit may be adjusted by varying a source voltage applied to the switching regulator circuit. Such a system negates the requirement for separate hardware or control wiring to interface with a feedback control circuit of the switching regulator circuit in order to adjust the light output. In some exemplary implementations of methods and apparatus according to various embodiments disclosed herein, different-spectrum LEDs are strategically placed in various current branches of a buck regulator circuit to facilitate adjustment of the respective drive currents provided to the LEDs, and thus a resulting color or color temperature of light from the combined spectrums, merely by adjusting the level of a DC source voltage supplied to the switching regulator circuit.

Some embodiments are directed to a lighting apparatus employing a buck regulator circuit including a first branch for conducting a switch current, a second branch for conducting a freewheeling current, and a third branch for conducting a load current. The buck regulator circuit further includes at least one first LED disposed in the first branch and/or the second branch of the buck regulator circuit.

Some embodiments are direct to a method for controlling a first current provided to at least one first LED in a first current branch of a buck regulator circuit and a second current provided to at least one second LED in a second current branch of the buck regulator circuit. The method contemplates varying a DC source voltage of the buck regulator circuit to increase a first magnitude of the first current provided to the at least one first LED and simultaneously decrease a second magnitude of the second current provided to the at least one second LED.

Some embodiments are directed to an apparatus, including a controllable DC source, a switch branch coupled to the controllable DC source, a filtering circuit, a load branch, and feedback control circuit. The switch branch comprises at least one switch and at least one first LED. The filtering circuit includes at least one inductor coupled to the at least one switch, at least one filter capacitor coupled to the at least one inductor, and at least one second LED coupled to the at least one inductor and the at least one filter capacitor, wherein the at least one second LED forms a freewheeling branch. The feedback control circuit is configured to change a duty cycle of the at least one switch to provide a regulated voltage or regulated current to the load branch, wherein changing the duty cycle of the at least one switch alters a first magnitude of first light generated by the at least one first LED and a second magnitude of second light generated by the at least one second LED.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection).

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

A conventional switching regulator circuit provides a regulated voltage or current to one or more loads (e.g., one or more LEDs) to provide an essentially stable operating power. However, a lighting apparatus incorporating a conventional switching regulator circuit may be limited in its ability to provide a range of variable light outputs including variable color or color temperature control; typically such variable color or color temperature control cannot be realized using a single regulator circuit. Furthermore, varying the light output emitted by one or more LEDs constituting the load of a conventional switching regulator circuit generally requires additional hardware and/or control wiring to provide access to the feedback control circuit of the regulator circuit (to adjust a reference voltage for the feedback control circuit and hence a duty cycle of the switching regulator circuit).

In spite of the foregoing limitations, Applicant has recognized and appreciated that a conventional switching regulator circuit may be modified to strategically insert one or more LEDs in different current paths or branches of the regulator circuit, thereby providing some degree of diverse control over the amount of current provided to the LEDs in the respective different current branches. Generally speaking, according to the concepts disclosed herein, an exemplary load such as one or more LEDs may be placed in one or more current branches of a switching regulator circuit that conventionally would not have been used to provide power to a load to nonetheless provide various advantages for an LED-based lighting apparatus.

For example, some embodiments and implementations disclosed herein are directed to methods and apparatus for altering drive currents provided to different-spectrum LEDs disposed in different branches of a single switching regulator circuit merely by varying the level of a DC source voltage that provides power to the circuit. The DC source voltage may be provided by a DC power source, or the DC source voltage may be provided by any other suitable combination of circuit elements such as an AC line voltage coupled to a rectifier and a filter to isolate the line voltage from the DC output voltage.

Figure 4A:
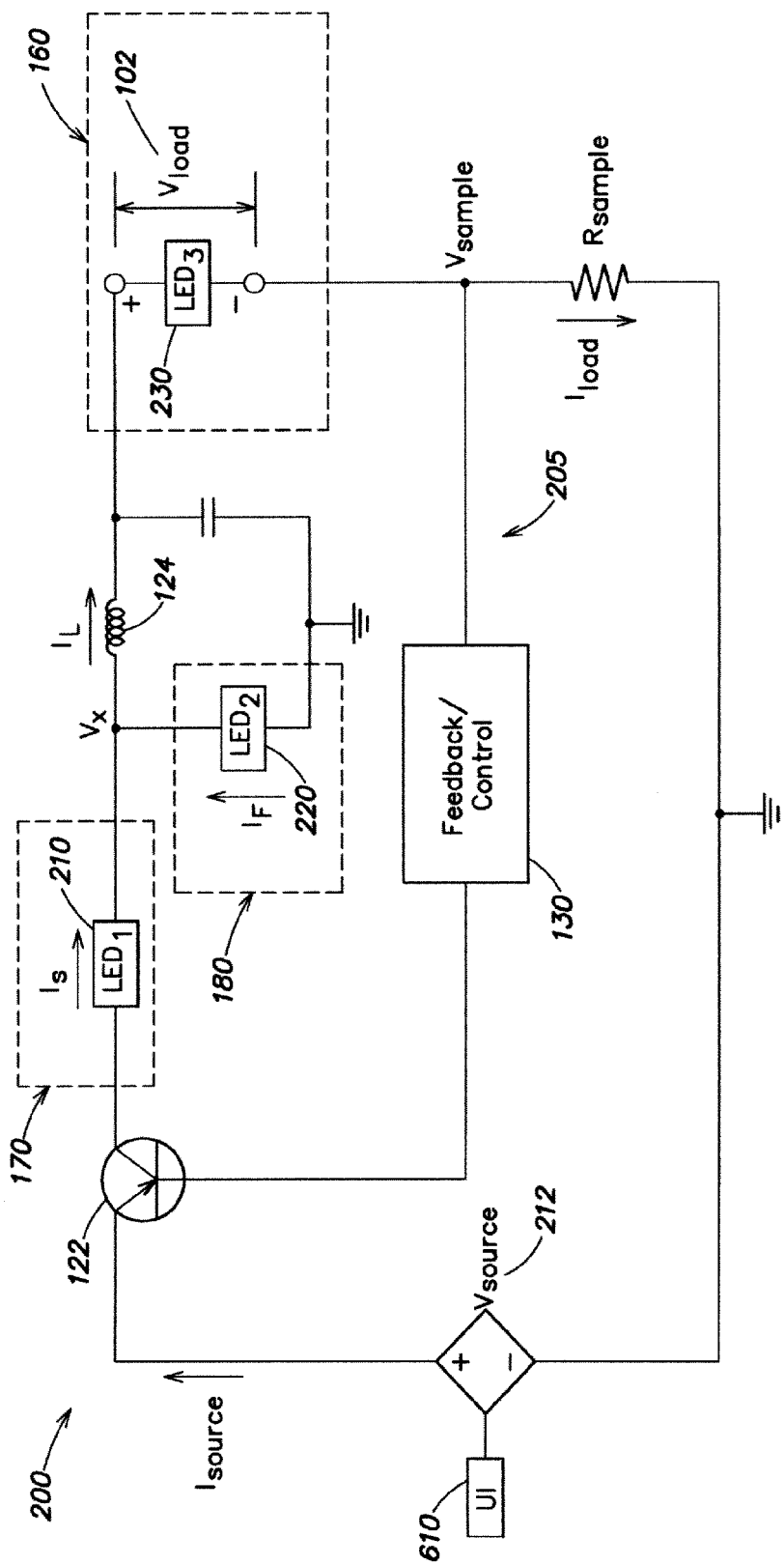
FIG. 4A is circuit diagram of a lighting apparatus with LEDs in three branches of a switching regulator circuit, according to some embodiments of the invention.

FIG. 4A illustrates an LED-based lighting apparatus 200 including a buck-type switching regulator circuit 205, according to one embodiment of the present invention. While the buck regulator circuit 205 shown in FIG. 4A differs in some salient respects from the conventional buck regulator shown in FIG. 1, the general functionality of the buck regulator circuit 205 is similar to that discussed above in connection with FIG. 1. In the apparatus of FIG. 4A, the buck regulator circuit comprises at least three current branches. For purposes of the present discussion, a "load branch" refers to a first branch 160 in which an operative load would be conventionally placed, to which the load voltage $V_{load}$ is applied, and through which the load current $I_{load}$ flows. A "switch branch" refers to a second branch 170 of the circuit 205 between the transistor switch 122 and an LC circuit which includes the inductor 124 and the filter capacitor 126. A current $I_S$ flows through the switch branch when the transistor switch 122 is closed (conducting). A "freewheeling branch" refers to a third branch 180 of the circuit 205 in which a freewheeling diode is typically placed in conventional buck regulators (see FIG. 1).

Although the current branch into which a load is typically placed in a conventional switching regulator is referred to herein as a "load branch," various embodiments of the present invention contemplate the placement of one or more operable loads, such as LEDs, in one or both of the switch branch 170 and the freewheeling branch 180, in addition to or in place of one or more loads in the load branch 160.

More specifically, Applicant has recognized and appreciated that although loads placed in the load branch of a buck regulator circuit are provided with a regulated voltage or current that is essentially unaffected by relatively small variations in the source voltage $V_{source}$, loads placed in other current branches of the circuit are dependent on the level of the source voltage when the buck converter is operated in continuous mode. For example, the time-average current $<<I_S>>$ in the switch branch is inversely proportional to the source voltage $V_{source}$, whereas the time-average current $<<I_F>>$ in the freewheeling branch is proportional to the source voltage $V_{source}$. This trait of buck regulators may be exploited in lighting apparatus to produce variable color or color temperature light emitted by the lighting apparatus by strategic insertion of multiple LEDs having different spectrums in at least two of the switch branch, the load branch, and the freewheeling branch of the switching regulator circuit.

For example, the lighting apparatus of FIG. 4A further comprises one or more first LEDs 210 in a switch branch 170, wherein a first drive current $I_S$ is provided to the first LED(s) 210, one or more second LEDs 220 in a freewheeling branch 180, wherein a second drive current $I_F$ is provided to the second LED(s) 220, and one or more third LEDs 230 in a load branch 160, wherein a third drive current $I_{load}$ is provided to the third LED(s) 230. Although only one LED is shown in each branch of the buck converter circuit in FIG. 4A for simplicity, it should be appreciated that the apparatus may include multiple LEDs in some or all of the circuit branches, and the multiple LEDs may be interconnected in any of a variety of serial, parallel, or serial-parallel arrangements such that the drive current supplied to the various LEDs in a given branch is sufficient to provide a desired lighting effect.

In one aspect, variable light output may be achieved with the lighting apparatus of FIG. 4A by intentionally varying the DC source voltage $V_{source}$ supplied to the buck regulator circuit over a range in excess of that typically contemplated in conventional buck regulators. A voltage range of $V_{source}$ that is contemplated by various embodiments is on the order of 1.11-10 times the load voltage $I_{load}$, which accommodates duty cycles of 10 to 90%. However, the voltage range is predominantly limited based on the voltage ratings of the selected circuit components, and the inductance value for the inductor may be chosen to allow for any desired voltage range. In various embodiments, as discussed further below, an analog or digital user interface 610, such as a potentiometer or a DAC, may be used to adjust the source voltage $V_{source}$ over a prescribed operating range suitable for eliciting a desired change in color or color temperature of light emitted from the lighting apparatus.

In the apparatus of FIG. 4A, a feedback control circuit 130 may be used to control one or more operating characteristics of the transistor switch 122 to provide a regulated load current $I_{load}$ to the LED(s) 230. For example, the current $I_{load}$ supplied to the LED(s) 230 may be regulated by controlling the switching frequency or the duty cycle of the transistor switch 122 as variations in the load current are detected, as discussed above in connection with FIG. 1. Various lighting apparatus disclosed herein may be calibrated to establish a set point for a reference voltage $V_{ref}$ in the feedback control circuit 130 with which to compare a sampled load current $I_{load}$. The criteria for setting the reference voltage $V_{ref}$ may be dependent on a particular lighting application, as the set point of the reference voltage may define a range of sensitivity for the LEDs in various branches of the buck regulator circuit.

In particular, some factors that may contribute to determining a set point for a reference voltage (which ultimately dictates the regulated load current) include, but are not limited to, the number and type of LEDs in each branch of the buck regulator circuit. For example, with a drive current of 20 mA, the forward voltage of a red LED (e.g., 1.8-2.2 V) is approximately half that of a blue LED (e.g., 3.6-4 V). Thus, a combination of the number and arrangement of different types of LEDs in the various branches of a buck regulator circuit together with expectations of a desired lighting effect may dictate how the feedback control circuit 130 is configured to achieve the desired lighting effect.

As discussed earlier, for a buck regulator circuit operating in continuous mode, the ratio of the load voltage $V_{load}$ to the source voltage $V_{source}$ is related to the duty cycle of the transistor switch according to the following relation:

$$\frac{V_{load}}{V_{source}} = \frac{t_{on}}{T} = D,$$

where D is the duty cycle of the transistor switch, $t_{on}$ is the amount of time that the switch is conducting, and T is the time for one switching period (i.e., $T=t_{on}+t_{off}$). As should be appreciated from the above relation and FIG. 4A, for LED(s) in the freewheeling branch 180, the time-average current $<<I_f>>$ delivered to the freewheeling LED(s) 220 is dependent on the duty cycle of the transistor switch 122. More particularly, as the source voltage $V_{source}$ is increased, the feedback control circuit 130 sends a control signal 140 to the transistor switch 122 to decrease its duty cycle (by decreasing $t_{on}$) to maintain a constant load current $I_{load}$. Since the freewheeling LED(s) 220 is/are activated during the portion of a switching cycle when the transistor switch is not conducting (i.e., during $t_{off}$), an increase in the source voltage $V_{source}$ causes a decrease in the duty cycle (i.e., an increase in $t_{off}$), which in turn results in more power being delivered to the LED(s) 220 in the freewheeling branch of the regulator circuit.

In contrast, for LED(s) in the switch branch 170, the power delivered to the switch LED(s) 210 is inversely proportional to the source voltage $V_{source}$. That is, when the source voltage $V_{source}$ is increased, the duty cycle, and thus the conduction time ($t_{on}$) of the transistor switch 122 is decreased. The decrease in the switch conduction time $t_{on}$ results in a decrease in the time-average current $<<I_s>>$ provided to the switch LED(s) 210, resulting in decreased power to the switch LED(s). Thus, by increasing the source voltage $V_{source}$, the power provided to LED(s) in the switch branch 170 is decreased, the power provided to LED(s) in the freewheeling branch 180 is increased, and the power provided to LED(s) in the load branch 160 remains relatively unchanged due to the regulated load current $I_{load}$ supplied by the buck regulator circuit. Conversely, if the source voltage $V_{source}$ is decreased, the power provided to LED(s) in the switch branch is increased, and the power provided to LED(s) in the freewheeling branch is decreased.

Figure 3:
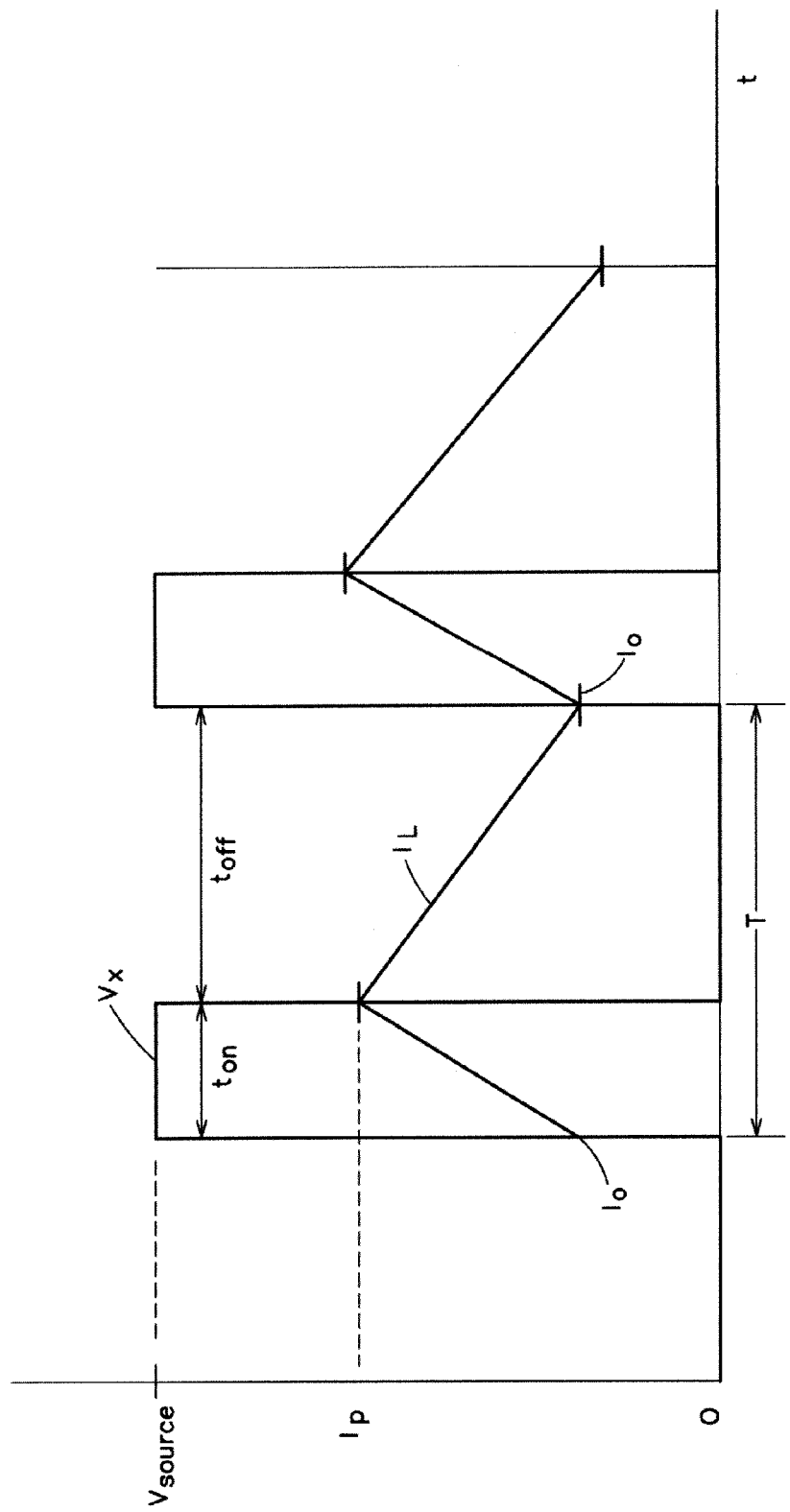
FIG. 3 is a diagram particularly illustrating inductor current vs. applied voltage to one terminal of the inductor with respect to ground during two consecutive switching operations in the converter of FIG. 1.

The aforementioned relationships between the source voltage and time-average drive currents in the switch branch 170 and the freewheeling branch 180 respectively depend at least in part on the buck regulator circuit operating in continuous mode. As described earlier, conventional buck regulator circuits may operate in either continuous mode or discontinuous mode. As illustrated in FIG. 3, during continuous mode, the current flowing through the inductor 124 does not fall to zero between switching cycles of the transistor switch 122. In contrast, if the duty cycle of the transistor switch 122 is very low, such that $t_{off}$ is much longer than $t_{on}$, only a small amount of energy is stored in the inductor 124 when the transistor switch 122 is closed, and this energy may rapidly dissipate when the transistor switch 122 is open, allowing the current flowing through the inductor 124 to fall to zero during the "off" portion of the switching cycle, and resulting in the regulator circuit operating in discontinuous mode. If the switching regulator circuit operates in discontinuous mode, the current in the freewheeling branch 180 may fall to zero during the period $t_{off}$. Accordingly, this lack of a significant drive current provided to the freewheeling LED(s) 220 during a portion of the switching cycle may result in unpredictable or undesirable performance of LED(s) in the freewheeling branch 180.

By placing LEDs that generate different spectra of radiation in two or more of the switch branch 170, freewheeling branch 180, and load branch 160 of the buck regulator circuit shown in FIG. 4A, variable color and/or color temperature lighting effects may be achieved using a single regulator circuit. For example, in one exemplary embodiment, the LED(s) 230 in the load branch may emit essentially white light, the LED(s) 210 in the switch branch may emit essentially red light, and the LED(s) 220 in the freewheeling branch may emit essentially blue light.

Figure 4B:
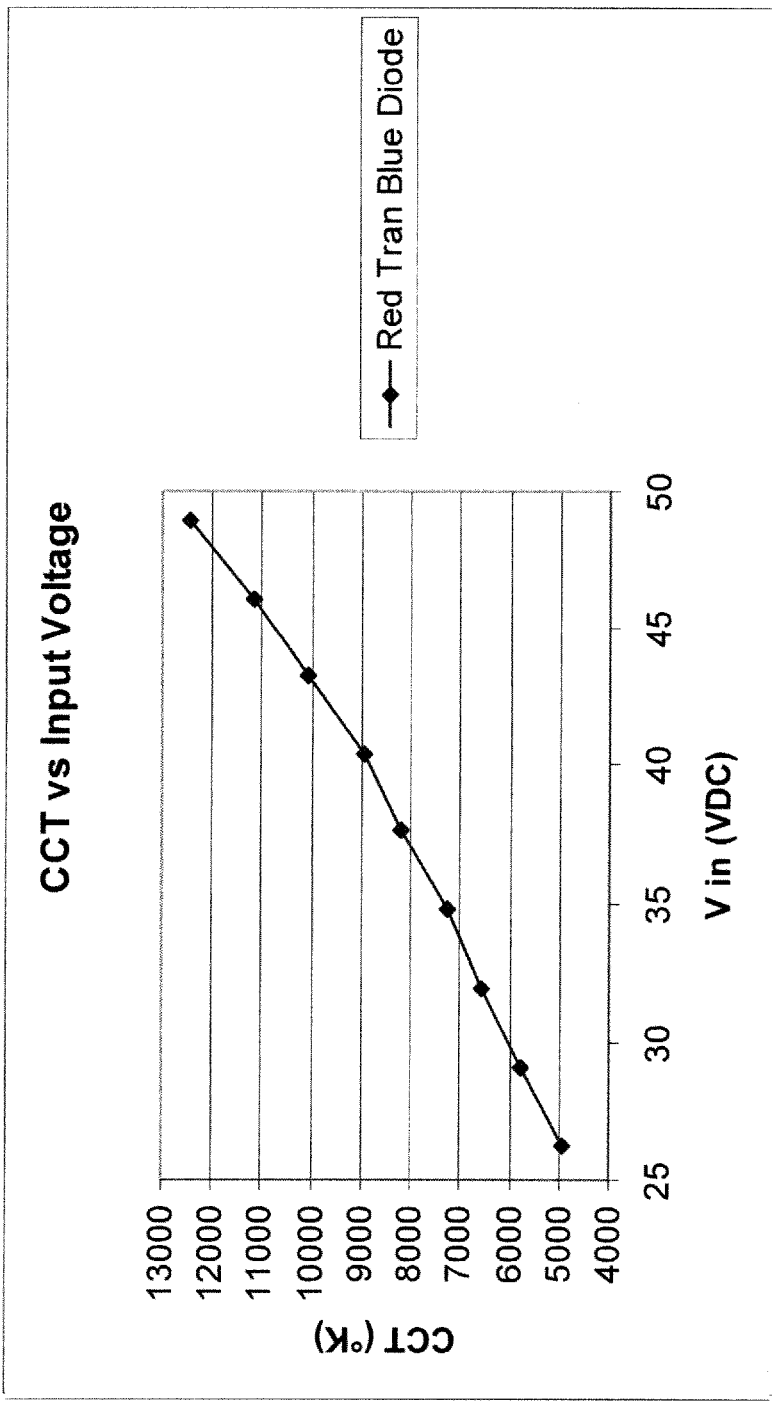
FIG. 4B is a diagram of simulation results when the LEDs in the switch branch of FIG. 4A are red LED(s), the LEDs in the freewheeling branch are blue LED(s), and the LEDs in the load branch are white LED(s), according some embodiments of the invention.

More specifically, if one or more red LEDs are placed in the switch branch and one or more blue LEDs are placed in the freewheeling branch, an increase in the source voltage $V_{source}$ results in a corresponding decrease in the duty cycle of the transistor switch 122. This decrease in duty cycle causes an increase in the power delivered to the freewheeling LEDs 220 (more blue light) and a decrease in the power delivered to the switch LEDs 210 (less red light), resulting in a perceived increase in the color temperature of the combined light output from the lighting apparatus 200. That is, the combined light output of the lighting apparatus 200 may be perceived to have a cooler color temperature having more blue spectral content. FIG. 4B shows the results of a simulation corresponding to this embodiment by demonstrating how the correlated color temperature (CCT) changes as a function of source voltage $V_{source}$ ($V_{in}$ in FIG. 4B). Since the average switch path current decreases with increases in input voltage, and the average freewheeling diode path current increases with increases in input voltage the light output from the lighting apparatus appears as less red, or cooler, with a higher CCT, as the source voltage is increased.

In another embodiment, the color of the LED(s) in the switch branch and the freewheeling branch may be reversed, such that the LED(s) 210 in the switch branch emit essentially blue light and the LED(s) 220 in the freewheeling branch emit essentially red light. In either of these embodiments, varying the source voltage $V_{source}$ may have the effect of changing the perceived color temperature of generally white light emitted from the lighting apparatus 200 resulting from the combined spectrums, when present, generated by the LEDs in the respective branches.

Figure 4C:
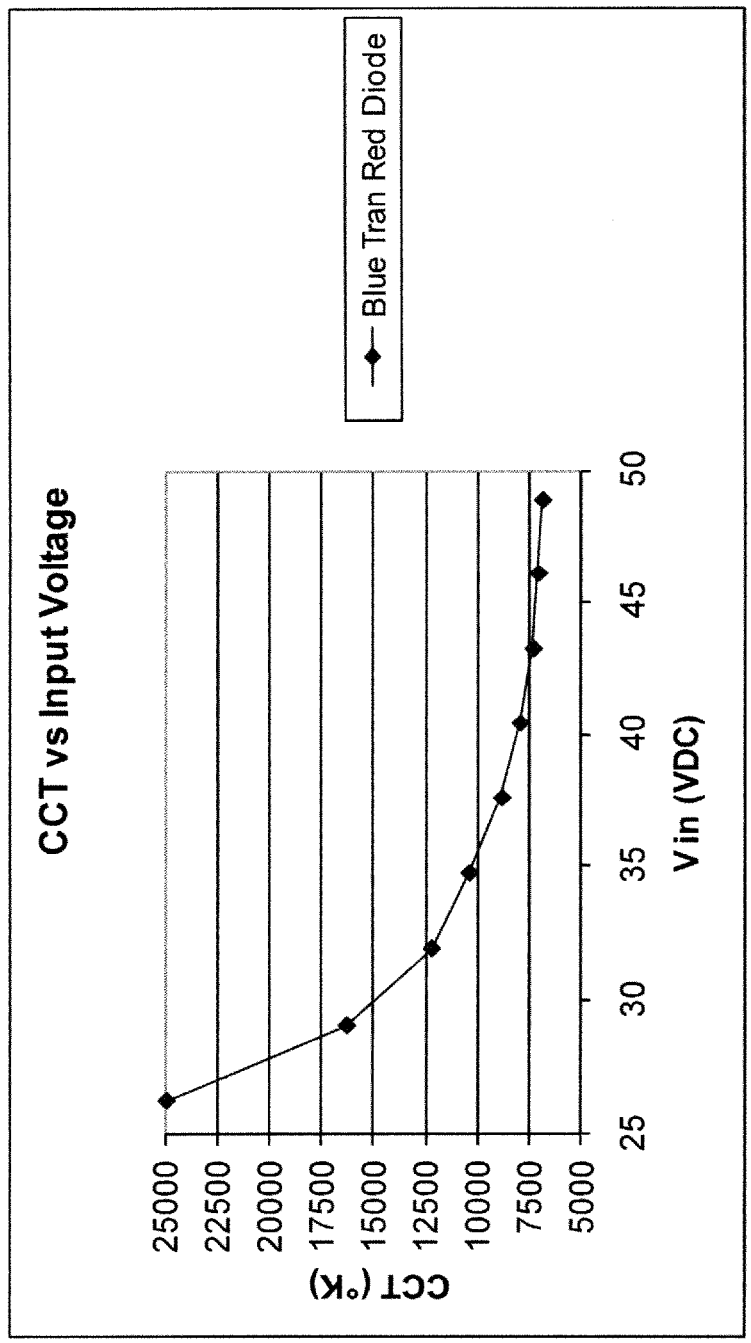
FIG. 4C is a diagram of simulation results when the LEDs in the switch branch of FIG. 4A are blue LED(s), the LEDs in the freewheeling branch are red LED(s), and the LEDs in the load branch are white LED(s), according some embodiments of the invention.

More specifically, in this embodiment, a decrease in the source voltage $V_{source}$ in this example results in a corresponding increase in the duty cycle of the transistor switch 122 and a perceived decrease in the color temperature of the combined white light emitted from the lighting apparatus 200, as the power delivered to red LEDs in the switch branch 170 is increased and the power delivered to blue LEDs in the freewheeling branch 180 is decreased. FIG. 4C shows the results of a simulation corresponding to this embodiment by demonstrating how the correlated color temperature (CCT) changes as a function of source voltage $V_{source}$ ($V_{in}$ in FIG. 4C). Since the average switch path current decreases with increases in input voltage, and the average freewheeling diode path current increases with increases in input voltage the light output from the lighting apparatus appears as more red, or warmer, with a lower CCT as the source voltage is increased.

Although only LEDs that emit red, blue, or white light have been discussed in connection with the apparatus of FIG. 4A, it should be readily appreciated that LED(s) having a variety of output spectrums may be used in any combination in different branches of the apparatus, and aspects of inventive embodiments are not limited in this respect. For example, the LED(s) in the load branch may comprise a combination of red LEDs, blue LEDs, and green LEDs, and when the combination of load LEDs is activated in tandem the load LEDs appear to emit essentially white light.

Figure 5:
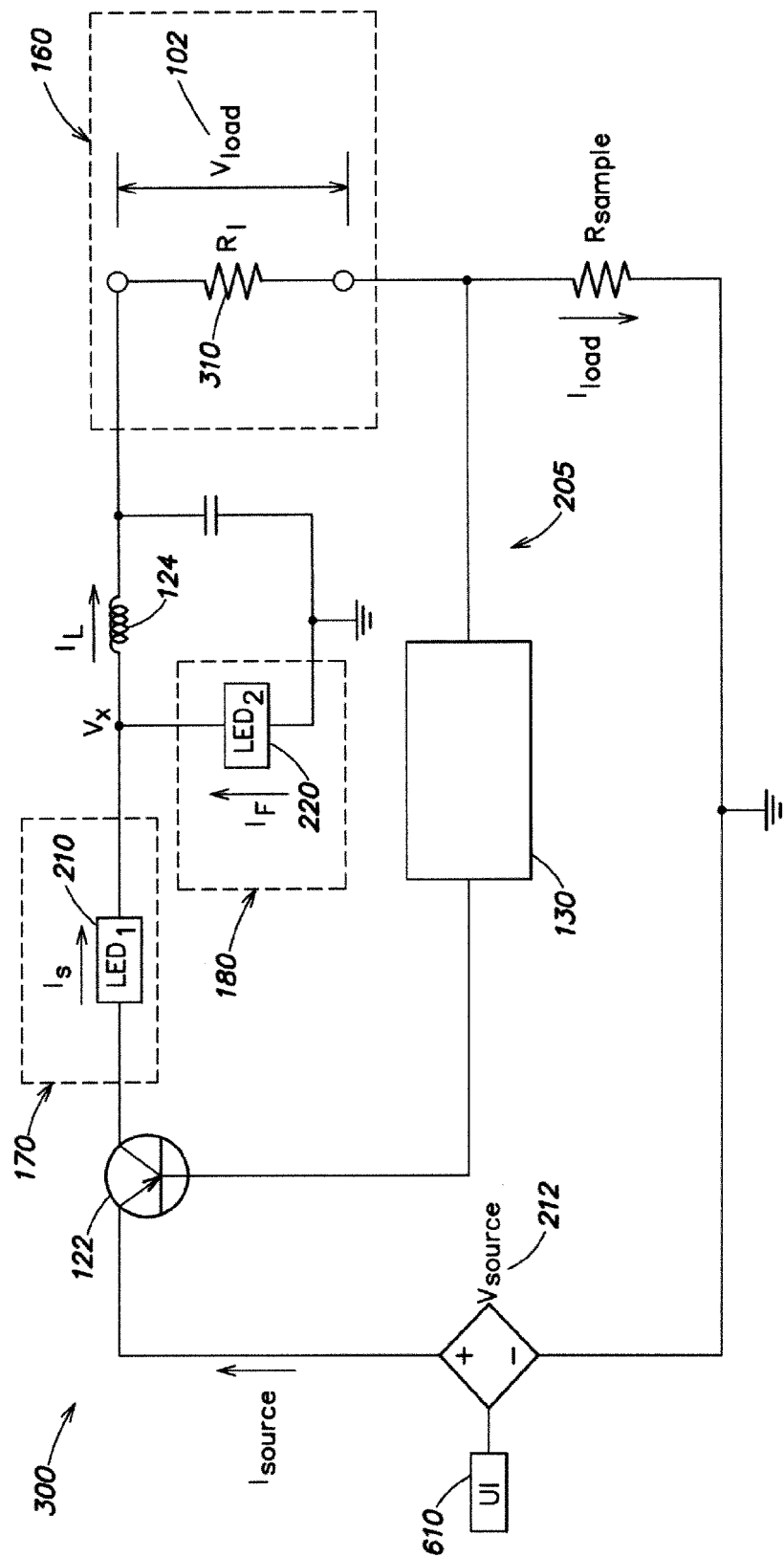
FIG. 5 is a circuit diagram of a lighting apparatus with LEDs in a switch branch and a freewheeling branch of a switching regulator circuit, according to some embodiments of the invention.

In another embodiment, a lighting apparatus 300 as shown in FIG. 5 may include LED(s) 210 having at least one first color in the switch branch and LED(s) 220 having at least one second color in the freewheeling branch 180 of a buck regulator circuit 205. In this embodiment, a load resistor 310, or any other suitable load element may be inserted in the load branch rather than the LED(s) 230 as shown in FIG. 4A. In order to assure a proper functioning of the buck converter, the resistive load may have a nominal value to ensure that the inductor 124 always carries current (i.e., continuous mode is maintained). A nominal value of the resistive load may be determined by considering a desired input voltage and the currents through the switch branch and the freewheeling branch. For example, in an embodiment, where it is desired to provide an average current of 500 mA to each of switch LED(s) 210 and freewheeling LED(s) 220 using a nominal DC source voltage $V_{source}$ of 12 V, the feedback control circuit 130 may be configured to operate the transistor switch 122 at a 50% duty cycle (providing 6 V DC output). In this example, the required output current for the LED(s) is 2×500 mA=1 A output current, and a nominal value of the load resistor 310 may be 6V/1 A=6 ohms, which would dissipate only 6 watts of power. If the current flow through the inductor 124 is not continuous, effective regulation of the load voltage $V_{load}$ or load current $I_{load}$ may become poorer or not possible, and may therefore be unacceptable for some applications.

In the illustrative embodiment of FIG. 5, the switch LED(s) 210 may have a first color and the freewheeling LED(s) 220 may have a second color. For example, for a common cathode bi-color, green-red LED, the red LED may be connected in the switch branch 170 as LED 210, and the green LED may be connected in the freewheeling branch 180 as LED 220. As described above, the power delivered to each of the LEDs in the switch branch 170 and the freewheeling branch 180 is a function of the source voltage $V_{source}$ provided to the circuit, as the duty cycle of the transistor switch 122 is automatically adjusted by the feedback control circuit 130 to deliver a regulated current $I_{load}$ to the load $R_1$.

In one illustrative example of the operation of the circuit in FIG. 5, if the source voltage $V_{source}$ is twice the load voltage $V_{load}$, the duty cycle of the transistor switch is 50% and the power delivered to each of the LEDs in the switch branch 170 and the freewheeling branch 180 is approximately equal (because $t_{on}=t_{off}$). In this instance, the perceived combined light from the lighting apparatus 300 is orange, as substantially equal power is delivered to the red LED(s) in the switch branch 170 and the green LED(s) in the freewheeling branch 180. However, as the source voltage $V_{source}$ is increased, the feedback control circuit 130 provides a control signal to the transistor switch 122 to decrease its duty cycle (i.e., decrease $t_{on}$) to maintain a stable load voltage $V_{load}$ or load current $I_{load}$. The decrease in the duty cycle of the transistor switch 122 has opposing effects on the LED(s) in the switch branch 170 and the freewheeling branch 180. The power delivered to the switch LED(s) 210 decreases as $t_{on}$ decreases, resulting in less intense red light being emitted from the switch LED(s) 210. In contrast, the power delivered to the freewheeling LED(s) 220 is increased as $t_{on}$ decreases (and $t_{off}$ increases), resulting in a more intense green light being emitted from the freewheeling LED(s) 220. Thus, the resultant perceived combined light emitted from the lighting apparatus 300 upon increasing the source voltage appears as predominantly green due to the mixing spectra, when present, of the light emitted by the LEDs in the switch branch 170 and the freewheeling branch 180. In contrast, decreasing the source voltage $V_{source}$ results in a perceived color change in which the combined light output appears as predominantly red.

It should be readily appreciated that any suitable color LED(s) may be used for the switch LED(s) 210 and the freewheeling LED(s) 220 in the lighting apparatus 300 depending on the desired lighting effect, and the aforementioned example of a bi-color, red-green LED is provided merely for illustrative purposes. For example, one or more LEDs in both the switch branch 170 and the freewheeling branch 180 may emit light perceived as essentially white light. However, the LED(s) in one of the switch branch 170 and the freewheeling branch 180 may have a perceived "warmer" color temperature, and the LED(s) in the other of the switch branch and the freewheeling branch may have a perceived "cooler" color temperature (e.g., the LED(s) 210 may include one or more first white LEDs that generate first radiation having a first spectrum corresponding to "warm" white light, and the LED(s) 220 may include one or more second white LEDs that generate second radiation having a second spectrum corresponding to "cool" white light, or vice versa). In this exemplary configuration, changes to the source voltage $V_{source}$ may increase or decrease the perceived color temperature of the combined spectra of light generated by the LEDs in the lighting apparatus.

Figure 6A:
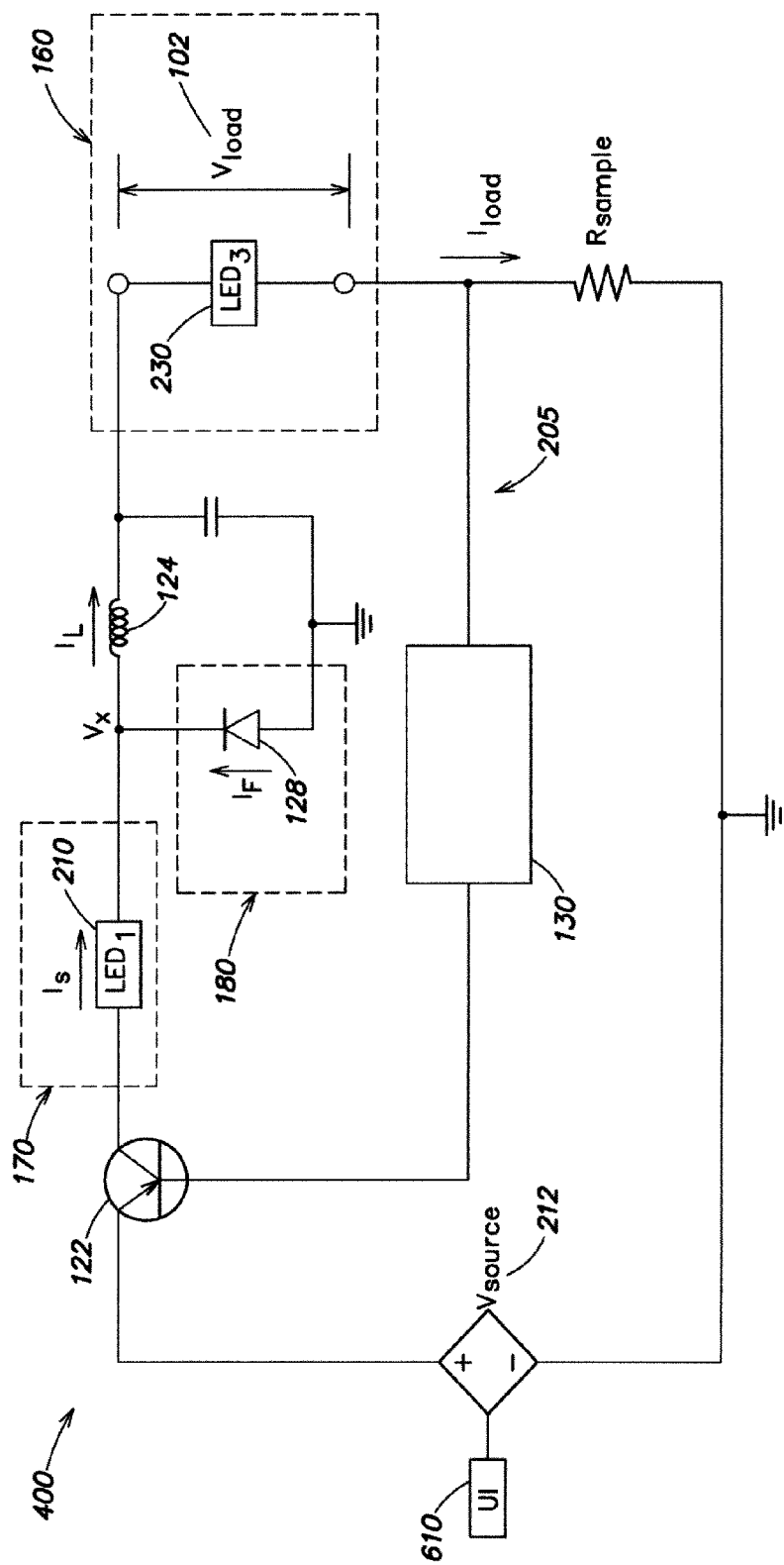
FIG. 6A is a circuit diagram of a lighting apparatus with LEDs in a switch branch and a load branch of a switching regulator circuit, according to some embodiments of the invention.

Yet other embodiments are directed to a lighting apparatus in which one or more LEDs may be connected in the switch branch 170 or the freewheeling branch 180, but not necessarily in both current branches. As shown in FIG. 6A, a lighting apparatus 400 comprises a buck regulator circuit 205 in which first LED(s) 210 are connected in the switch branch 170 and second LED(s) 230 are connected in the load branch 160. The freewheeling diode 128 may be a diode with a fast recovery time that is typically used in a conventional buck converter. In one exemplary implementation based on FIG. 6A, the LEDs 210 in the switch branch 170 may be green LEDs, and the LEDs 230 in the load branch 160 may be yellow LEDs. Varying the source voltage $V_{source}$ causes the feedback control circuit 130 to correspondingly change the duty cycle of the transistor switch 122 to provide a regulated load current $I_{load}$ to the LEDs 230 in the load branch 160. The resultant perceived combined light emitted from the lighting apparatus 400 in this configuration may accordingly vary along a yellow-green continuum as the source voltage $V_{source}$ is changed.

At least one advantage of the circuit illustrated in FIG. 6A is that achieving maximum power through the LED(s) in the switch branch 170 may be accomplished by decreasing the source voltage $V_{source}$ to a small value that limits the power consumption of the circuit, yet still provides enough voltage for the buck regulator circuit to operate in continuous mode and deliver adequate power to the LED(s) in the load branch 160. Such low-power embodiments may be useful in a variety of lighting environments, and the implementation of such embodiments is not limited in any respect.

Figure 6B:
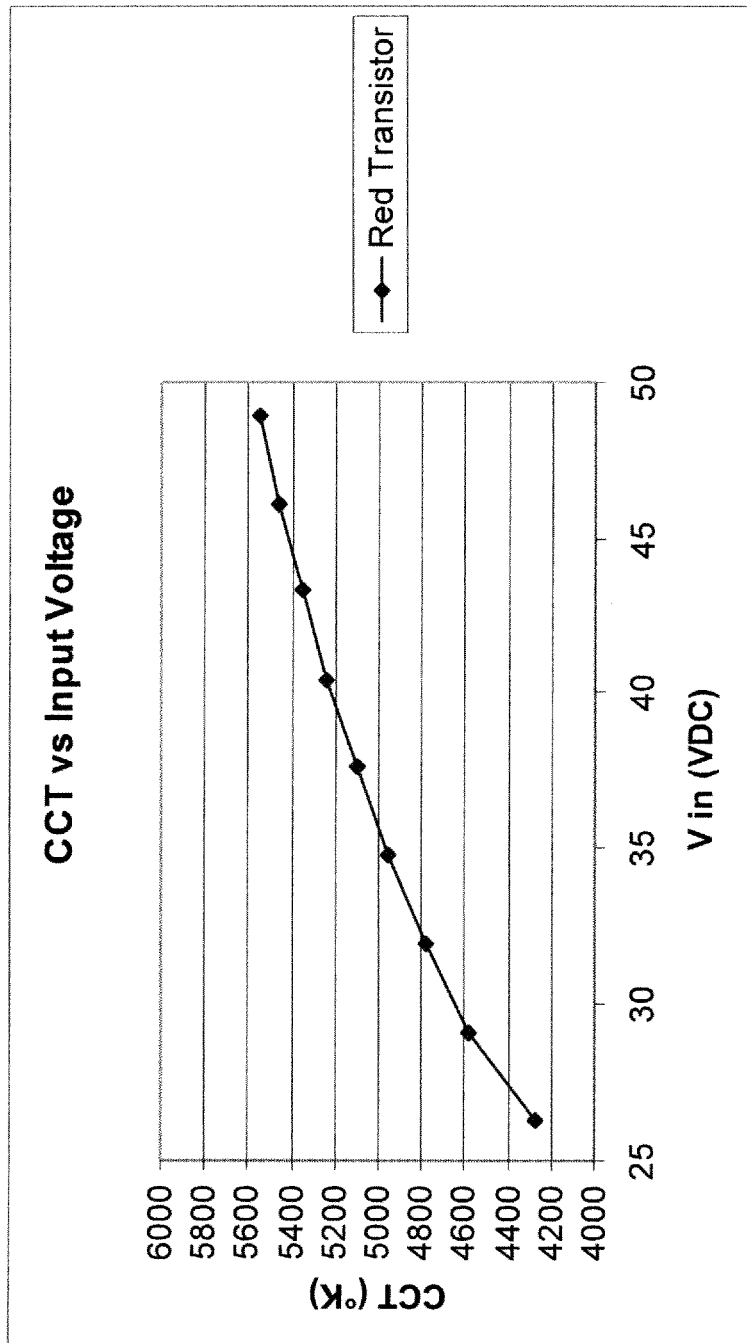
FIG. 6B is a diagram of simulation results when the LEDs in the switch branch of FIG. 6A are red LED(s), according some embodiments of the invention.

FIG. 6B illustrates the results of a simulation demonstrating the effect of source voltage on correlated color temperature when the LED(s) in the switch branch 170 of the lighting apparatus shown in FIG. 6A are red LED(s). As shown in FIG. 6B, as the source voltage $V_{source}$ ($V_{in}$ in FIG. 6B) is increased, the average switch path current decreases. Thus, the light output by the lighting apparatus appears less red, or cooler, with a higher CCT at higher source voltages.

The circuit components in the preceding exemplary embodiments of lighting apparatus may have any suitable values. For example, in the simulations of FIGS. 4A, 4B, and 6B, the circuit components had the following values: $R_{sample}$=0.5 ohm, inductor 124=220 µH, capacitor 126=1 µF, and the control IC was an L4976D circuit. It should be appreciated that the aforementioned values are merely exemplary, and the circuit components of the lighting apparatus described herein may also have other suitable values.

Figure 1:
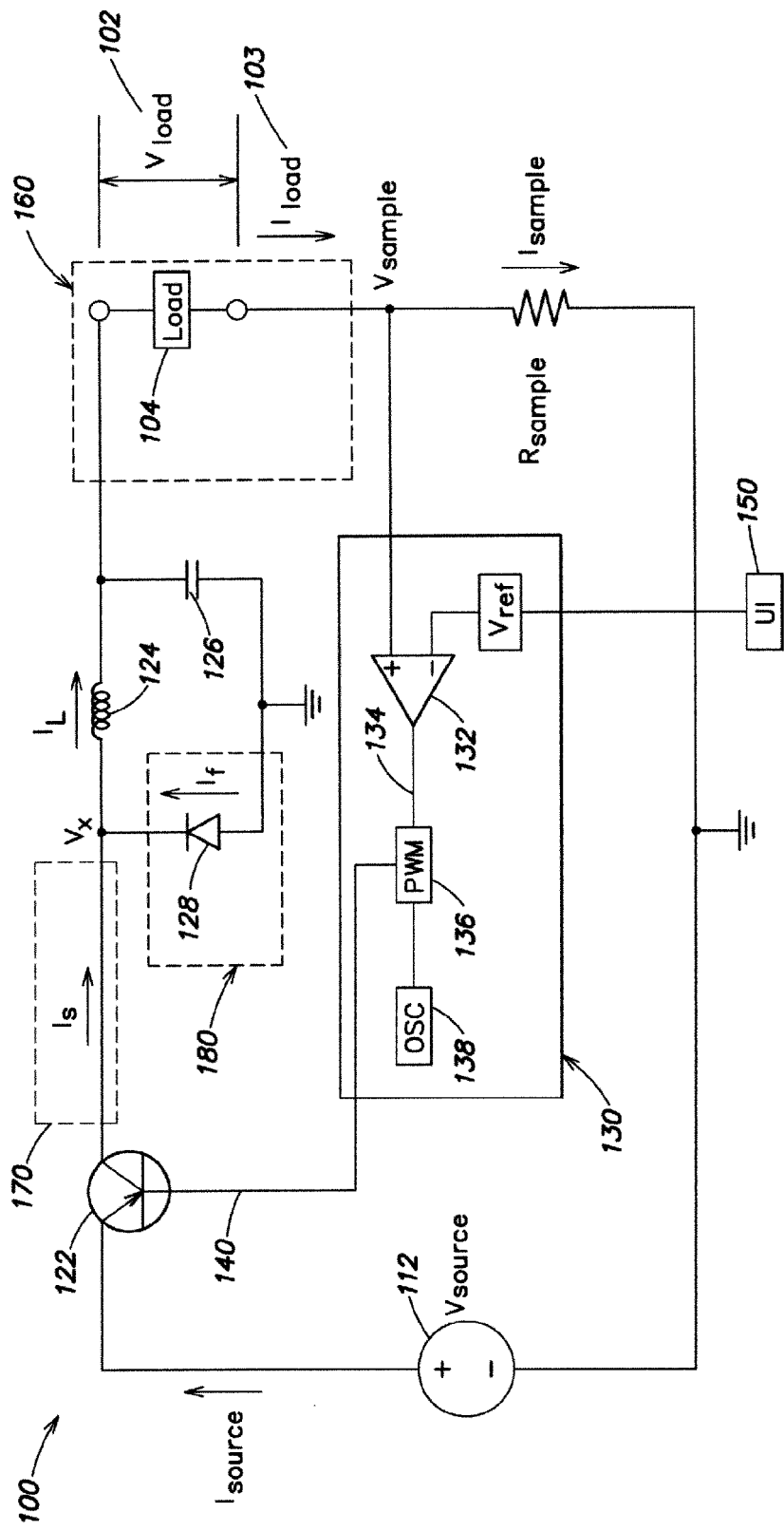
FIG. 1 is a circuit diagram of a conventional step-down or "buck" type DC-DC converter.
Figure 2:
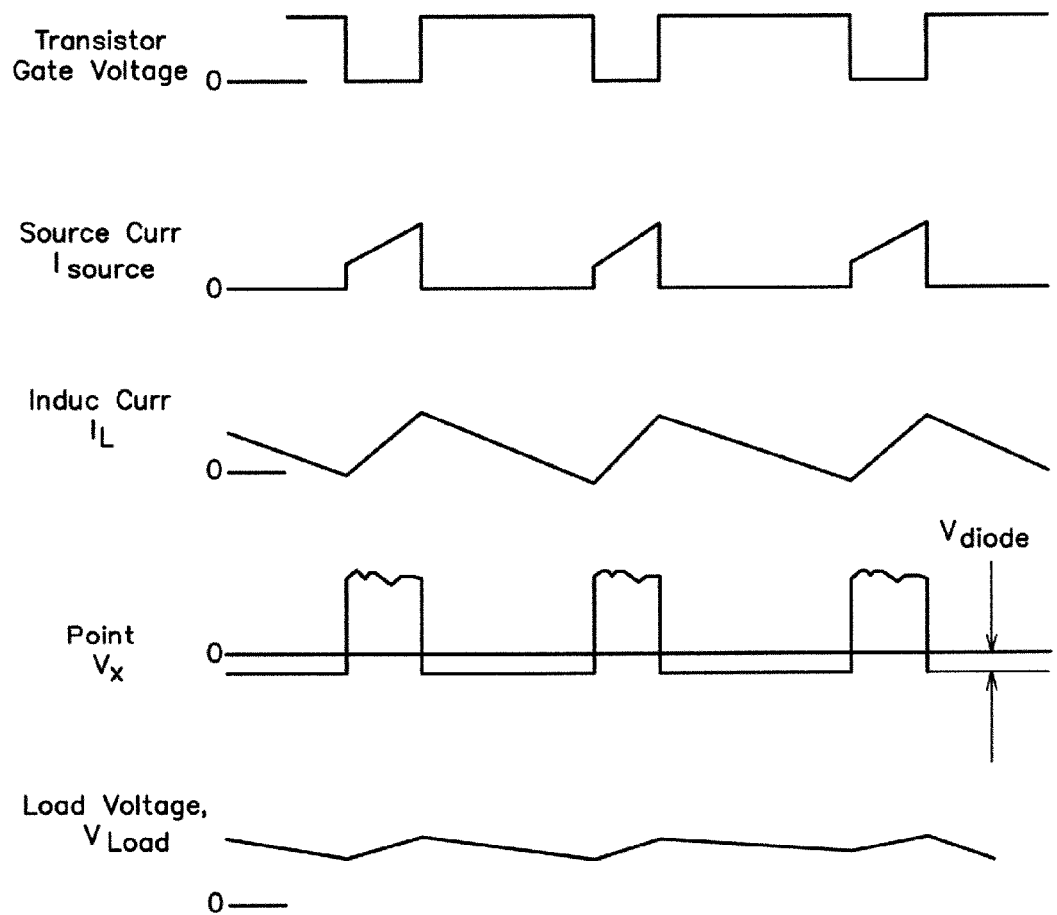
FIG. 2 is a diagram illustrating various operating signals associated with the DC-DC converter of FIG. 1.
Figure 7:
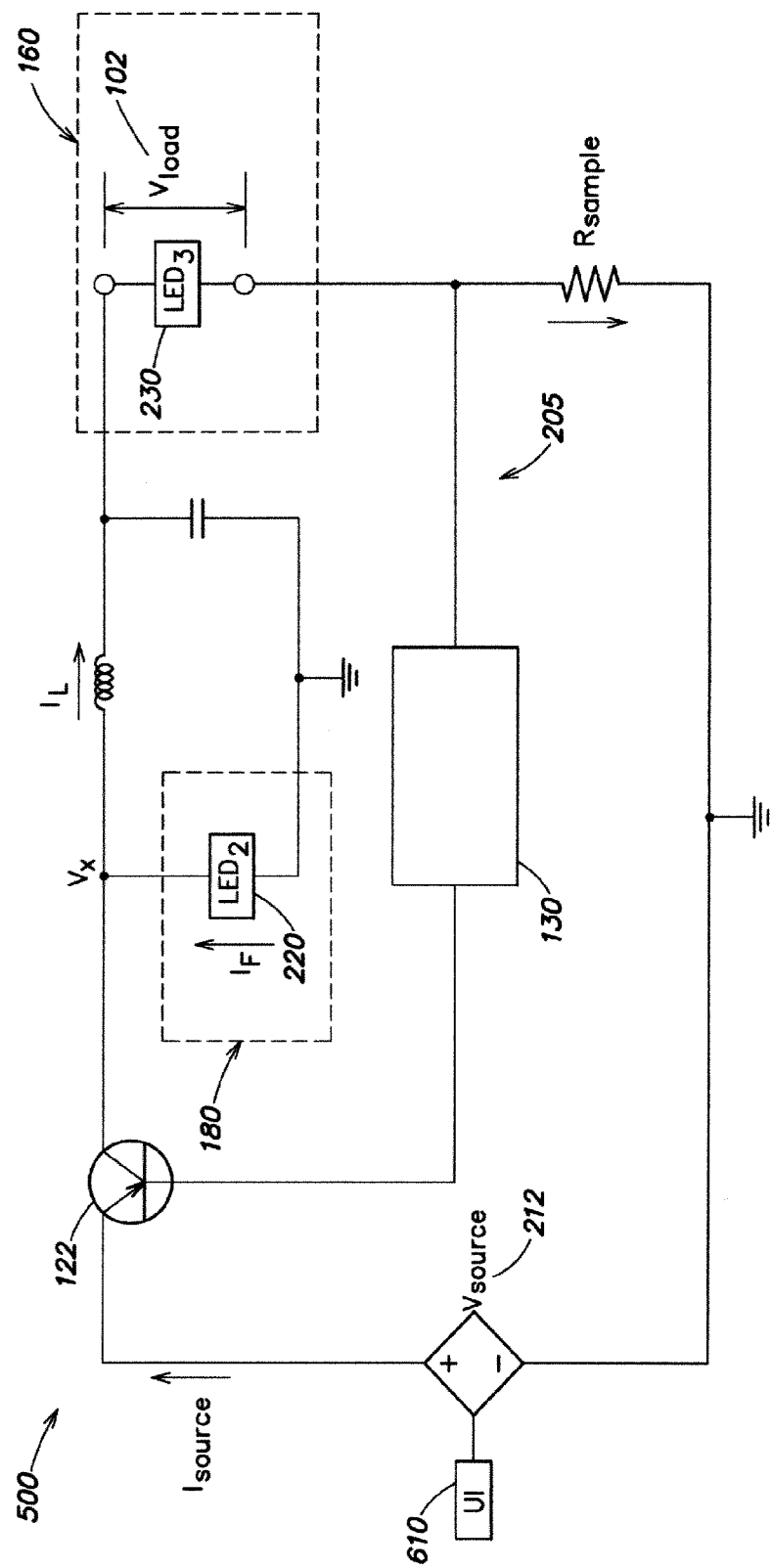
FIG. 7 is a circuit diagram of an alternative lighting apparatus with LEDs in a freewheeling branch and a load branch of a switching regulator circuit, according to some embodiments of the invention.

In another embodiment, the freewheeling diode 128 of the conventional buck converter shown in FIG. 1 may be replaced with an LED 220 as illustrated in FIG. 7. Such a configuration for the lighting apparatus 500 may allow for similar lighting effects to be generated as described above in connection with the lighting apparatus 400 shown in FIG. 6A, but without the added complexity of connecting additional LEDs in the switch branch of the circuit. That is, the lighting apparatus 500 facilitates the generation of perceived combined light emitted from the lighting apparatus to vary along a single color dimension, as described above for the lighting apparatus 400. For example, since the power delivered to the freewheeling LED(s) 220 is proportional to the source voltage $V_{source}$, an increase in the source voltage results in an increase in the power delivered to the freewheeling LED(s) 220 to produce a desired lighting effect.

While the exemplary embodiments discussed thus far include one or more LEDs in two or more branches of the buck regulator circuit 205, in yet other embodiments LED(s) may be connected in either the switch branch 170 or the freewheeling branch 180, and a load resistor or other suitable resistive device with some appropriate value may be connected in the load branch of a buck regulator circuit. The purpose of the load resistor or other resistive device may not be to emit light, but rather to allow for proper operation of the buck regulator circuit (e.g., in continuous mode) and to help set the desired duty cycle. In such embodiments, variations in the source voltage $V_{source}$ may result in the power delivered to the LED(s), when present, to correspondingly increase or decrease according to the principles outlined above. As such, variations in the source voltage $V_{source}$ result in a perceived dimming effect for the light emitted from a light apparatus having one or more LEDs in either the switch branch 170 or the freewheeling branch 180, but not necessarily both current branches.

At least some inventive embodiments described herein to generate combined light having variable color and/or color temperature properties, which may be altered based on variations in an applied source voltage $V_{source}$, require that the source voltage be intentionally varied to produce a desired lighting effect. As such, as discussed above, some embodiments may comprise at least one user interface 610 to vary the source voltage, as illustrated in FIGS. 4-7. One suitable user interface 610 may comprise an analog device such as a variable resistor or potentiometer connected to a controllable voltage source 212. By adjusting the value of the potentiometer, the source voltage applied to the transistor switch 122 may be accordingly adjusted. Alternatively, the user interface 610 may comprise a digital device including but not limited to, a digital to analog converter (DAC) and/or a microprocessor, and the user interface 610 may connected to the lighting apparatus of various embodiments in any suitable way to variably control the source voltage $V_{source}$.

Figure 8:
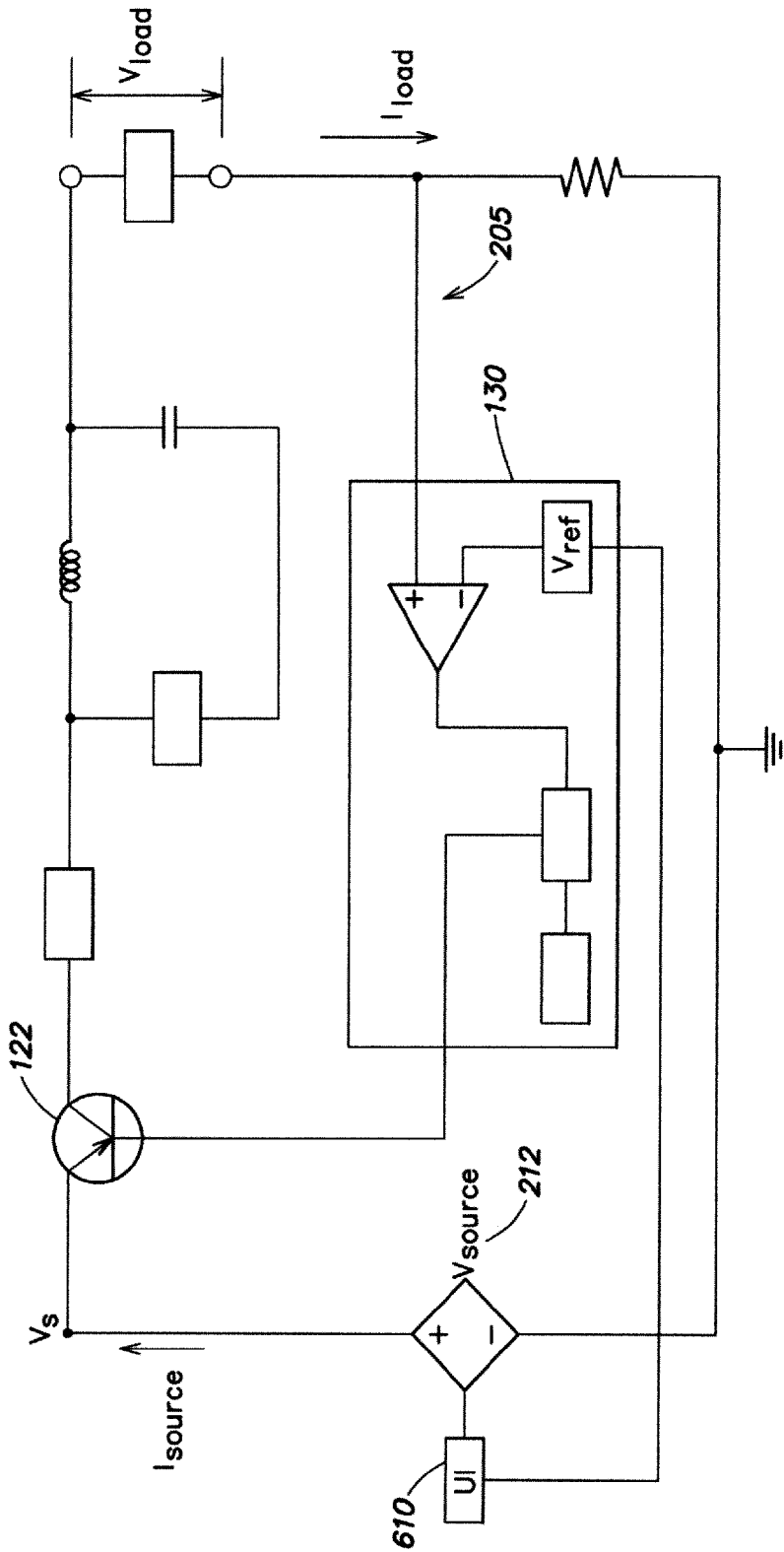
FIG. 8 is a circuit diagram of a lighting apparatus having a user interface for simultaneously modifying a source voltage supplied to a switching regulator circuit and a reference voltage in a feedback control circuit, according to some embodiments of the invention.

In some embodiments, the user interface 610 may be configured to interface with both the controllable voltage source 212 and the feedback control circuit 130 as shown in FIG. 8. Such an arrangement may facilitate simulation of incandescent light sources, as well as a number of other lighting effects, via a lighting system that incorporates LEDs. For example, when an incandescent light source is dimmed, generally the perceived color temperature of the emitted light is simultaneously reduced such that the light appears to have a more red or "warm" characteristic. Controlling both a set point (reference voltage $V_{ref}$) in the feedback control circuit 130 and the source voltage $V_{source}$ in some implementations allows for both dimming of LEDs placed in the load branch of the switching regulator circuit and a simultaneous increase/decrease of the color temperature of the combined light emitted from the lighting apparatus due to operation of LEDs in the switch and freewheeling branches of the switching regulator circuit.

In particular, consider the aforementioned example illustrated in FIG. 4A, where LED(s) emitting essentially white light are inserted in the load branch 160, red LED(s) are inserted in the switch branch 170, and blue LED(s) are inserted in the freewheeling branch 180. A user interface 610 may be configured to adjust a set point (e.g., $V_{ref}$) in the feedback control circuit 130 such that adjustments to the set point result in a decrease in power delivered to the LED(s) in the load branch to reduce the perceived brightness of the white light emitted by the load LED(s) (i.e., to produce dimming). Simultaneously, the source voltage may be decreased, thereby providing more time-average drive current $<<I_s>>$ to the red LEDs in the switch branch and less time-average drive current $<<I_f>>$ to the blue LEDs in the freewheeling branch.

The resultant combined light output may be essentially white light with a warmer color temperature having more reddish spectral characteristics as the overall brightness of the light output is decreased. Conversely, the set point may be adjusted via the user interface 610 to increase the power delivered to the LED(s) in the load branch to increase their intensity, and the source voltage may be simultaneously increased such that the combined light output of the lighting apparatus is white light that is perceived to have a cooler color temperature having bluish spectral characteristics. Circuitry within the user interface may impose limits on the degree to which the set point in the feedback control circuit 130 and/or the source voltage may be adjusted, so as to maintain the operation of the switching regulator circuit in a continuous mode. These concepts similarly may be employed using only one of the red and blue spectrums generated by one or more LEDs (disposed in only one of the switch and freewheeling branches).

In some embodiments, the user interface 610 of one or more lighting apparatus disclosed herein may additionally comprise an addressable processor to facilitate interconnection of one or more lighting apparatus in a networked configuration. In the networked connection, the source voltage $V_{source}$ (and optionally the reference voltage $V_{ref}$) applied to a given lighting apparatus may be individually controllable in response to an "addressed" lighting command intended specifically for the given lighting apparatus. Such lighting commands may be transmitted on the network in a variety of manners, and in some instances may originate from a central controller for controlling multiple such lighting apparatus coupled to form a network. More specifically, in a networked environment, control commands may be provided to a number of different devices including one or more lighting apparatus, and the control commands may include information related to desired source voltages (and/or reference voltages) for each of the addressable lighting apparatus. A processor of a given apparatus may identify particular information/data intended for it, and it may process the information/data to control the source voltage (or optionally the reference voltage) of the lighting apparatus accordingly (e.g., via adjustment of a DAC as part of user interface 610). It should be appreciated that lighting apparatus according to various embodiments of the present disclosure and configured for networked operation may be responsive to any of a variety of communication protocols including, but not limited to, DMX, RS-232, X10, and DALI.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A lighting apparatus, comprising:
   a buck regulator circuit comprising a first branch for conducting a switch current, a second branch for conducting a freewheeling current, and a third branch for conducting a load current;
   at least one first LED disposed in the first branch of the buck regulator circuit; and
   at least one second LED disposed in the second branch of the buck regulator circuit.

2. The apparatus of claim 1, wherein:
   the at least one first LED is configured to generate first radiation having a first spectrum; and
   the at least one second LED is configured to generate second radiation having a second spectrum different than the first spectrum.

3. The apparatus of claim 2, wherein one of the at least one first LED and the at least one second LED includes at least one red LED, and wherein another of the at least one first LED and the at least one second LED includes at least one blue LED.

4. The apparatus of claim 2, wherein the at least one first LED includes at east one first white LED and wherein the at least one second LED includes at least one second white LED.

5. The apparatus of claim 2, wherein the buck regulator circuit receives a source voltage and further comprises at least one load disposed in the third branch and at least one feedback control circuit for providing a regulated load voltage and/or a regulated load current to the at least one load, and wherein the apparatus further comprises:
   at least one user interface for varying the source voltage to the buck regulator circuit so as to control a first intensity of the first radiation and a second intensity of the second radiation.

6. The apparatus of claim 5, wherein the at least one load includes at least one third LED for generating third radiation.

7. The apparatus of claim 6, wherein:
   one of the at least one first LED and the at least one second LED includes at least one red LED;
   another of the at least one first LED and the at least one second LED includes at least one blue LED; and
   the at least one third LED includes at least one white LED.

8. The apparatus of claim 6, wherein the feedback control circuit includes a reference voltage for determining a value of the regulated load voltage or the regulated load current to the at least one load, and wherein the at least one user interface is configured to vary the source voltage to the buck regulator circuit and the reference voltage of the feedback control circuit so as to control the first intensity of the first radiation, the second intensity of the second radiation, and a third intensity of the third radiation.

9. A method, comprising
   providing at least one first LED in a first current branch of a buck regulator circuit and at least one second LED in a second current branch of the buck regulator circuit, and
   varying a DC source voltage of the buck regulator circuit to increase a first magnitude of a first current provided to the at least one first LED and simultaneously to decrease a second magnitude of a second current provided to the at least one second LED.

10. The method of claim 9, wherein the at least one first LED emits first radiation of a first spectrum and the at least one second LED emits second radiation of a second spectrum, and wherein varying the DC source voltage results in a change in at least one optical characteristic of combined radiation formed by a mixing of the first radiation and the second radiation.

11. The method of claim 10, wherein varying the DC source voltage results in a change in a color and/or color temperature of the combined light.

12. The method of claim 10, wherein the lighting control circuit further comprises at least one third LED, and wherein the at least one third LED emits third radiation of a third spectrum, and wherein a magnitude of the third radiation does not change in response to varying the DC source voltage.

13. An apparatus, comprising:
    a controllable DC source;
    a switch branch coupled to the controllable DC source and comprising at least one switch and at least one first LED;
    a filtering circuit comprising:
      at least one inductor coupled to the at least one switch;
      at least one filter capacitor coupled to the at least one inductor; and
      at least one second LED coupled to the at least one inductor and the at least one filter capacitor, wherein the at least one second LED forms a freewheeling branch;
    a load branch; and
    a feedback control circuit for changing a duty cycle of the at least one switch to provide a regulated voltage or regulated current to the load branch, wherein changing the duty cycle of the at least one switch alters a first magnitude of first light generated by the at least one first LED and a second magnitude of second light generated by the at least one second LED.

14. The apparatus of claim 13, wherein changing the duty cycle of the at least one switch occurs in response to a change in a source voltage output generated by the controllable DC source.

15. The apparatus of claim 13, further comprising at least one third LED connected in the load branch, wherein the at least one third LED generates third light as essentially white light.

16. The apparatus of claim 15, wherein the first light is essentially red light and the second light is essentially blue light.

17. The apparatus of claim 16, wherein the first light, second light, and third light combine to form combined essentially white light emitted from the apparatus, and wherein changing the duty cycle of the at least one switch results in a change in the color temperature of the combined essentially white light.

18. The apparatus of claim 13, further comprising at least one user interface configured to vary the output of the controllable DC source.

19. The apparatus of claim 18, wherein the at least one user interface is further configured to vary at least a portion of the feedback control circuit.

20. The apparatus of claim 19, wherein an operation of the at least one user interface simultaneously varies the output of the controllable DC source and the at least a portion of the feedback control circuit.

* * * * *